United States Patent

Mihic

[11] Patent Number: 5,820,309
[45] Date of Patent: Oct. 13, 1998

[54] SLOT MILLING TOOL WITH INSERTS CLAMPED BY ECCENTRIC OR CAM-SHAPED MEMBERS

[75] Inventor: Wlajko Mihic, Gävle, Sweden

[73] Assignee: Mircona AB, Sweden

[21] Appl. No.: 601,843

[22] PCT Filed: Nov. 4, 1992

[86] PCT No.: PCT/SE92/00762

§ 371 Date: May 25, 1994

§ 102(e) Date: May 25, 1994

[87] PCT Pub. No.: WO93/08945

PCT Pub. Date: May 13, 1993

Related U.S. Application Data

[63] Continuation of Ser. No. 232,283, May 25, 1994, abandoned.

[30] Foreign Application Priority Data

Nov. 7, 1991 [SE] Sweden ................................ 9103291

[51] Int. Cl.⁶ .............................. B23C 5/08; B23D 13/00
[52] U.S. Cl. ................................. 407/50; 407/51; 83/845
[58] Field of Search .............................. 407/41, 49–52, 407/102; 83/838–845; 144/230

[56] References Cited

U.S. PATENT DOCUMENTS

| 75,734 | 3/1868 | Clemson | 83/845 |
| 557,414 | 3/1896 | Motznik | 83/845 |
| 990,068 | 4/1911 | Searles . | |
| 1,455,968 | 1/1923 | Proctor | 83/845 |
| 1,707,903 | 4/1929 | Charlton . | |
| 3,785,021 | 1/1974 | Norgren | 83/845 X |
| 4,257,302 | 3/1981 | Heimbrand | 83/839 |
| 4,357,123 | 11/1982 | Zweekly . | |
| 4,363,576 | 12/1982 | Zweekly . | |
| 4,417,833 | 11/1983 | Wertheimer | 83/845 X |
| 4,558,974 | 12/1985 | Pano . | |
| 4,938,640 | 7/1990 | Pano et al. . | |

FOREIGN PATENT DOCUMENTS

| 0259847 | 3/1988 | European Pat. Off. . | |
| 918710 | 10/1954 | Germany | 144/230 |
| 3119834 | 12/1982 | Germany . | |
| 441247 | 9/1985 | Sweden . | |
| 452713 | 12/1987 | Sweden . | |
| 120050 | 8/1927 | Switzerland | 83/839 |
| 676448 | 7/1979 | U.S.S.R. | 83/845 |
| WO8910224 | 11/1989 | WIPO . | |

OTHER PUBLICATIONS

Brochure from Iscar Hartmetall GmbH.

*Primary Examiner*—Steven C. Bishop
*Attorney, Agent, or Firm*—Ware, Fressola, Van der Sluys & Adolphson LLP

[57] ABSTRACT

Slot or track milling tool device wherein a number of inserts having an insignificant axial extension are arranged in seats at the peripheral portion of an essentially disc shaped tool holder body. The inserts, being of a per se known kind, have at least one abutment face arranged obliquely relative to the insertion direction of the insert. The abutment face in contact with an abutment portion at each seat of the tool holder body. Each such abutment portion being a tongue shaped portion integral with the tool holder body. For each tongue shaped portion, there is arranged a rotatable clamping device having a surface arranged in a cam or eccentric fashion. The rotatable clamping device is intended to displace the tongue shaped portions so that an abutment point thereon reaches an engagement with and remains in engagement with the obliquely rearwardly facing engagement surface of the insert.

3 Claims, 1 Drawing Sheet

U.S. Patent     Oct. 13, 1998     5,820,309

SLOT MILLING TOOL WITH INSERTS CLAMPED BY ECCENTRIC OR CAM-SHAPED MEMBERS

This application is a continuation of copending application Ser. No. 08/232283 filed May 25, 1994, now abandoned.

TECHNICAL FIELD OF THE INVENTION

This invention relates to milling tools for slot milling operations, i.e. rotating tools for milling slots in work pieces and more particularly to the clamping of inserts in such tools.

BACKGROUND OF THE INVENTION

Many different types of rotating milling tools for slots are known. As an example, such a tool can include an essentially disc shaped body having, at its periphery, a number of recesses or cuts in which inserts are arranged. The cuts are arranged in such a way, relative to the inserts, e.g. with essentially radially located complementary abutments portions, that the necessary positioning in axial and circumferential direction, i.e. the direction of working, is achieved. In the radial direction, the tools are secured, other than by the influence of the cutting forces, by friction and clamping action exerted only by material portions adjoining the cuts. This clamping force is dependent on the tolerances between the cut and the insert and could to a certain extent also be influenced negatively by material fatigue in the adjoining material portions.

This implies that the ability of the disc shaped body to retain the inserts is dependent on the rotational speed of the milling tool, i.e. the centrifugal force. One of the most prominent drawbacks of known slot milling tools is their ability the inserts which decreases or ceases when the speed is go beyond the intended one and also when the mater disc shaped body starts to be fatigued. There are known cases where milling discs have been rotated with too high a speed and the inserts like bullets from an automatic weapon have been thrown from the retaining disc causing great hazard for persons nearby. It is obvious that such tools even if they have a warning notation concerning speed limit recommended by the manufacturer are to be regarded as dangerous tools.

One object of the invention is to provide a device eliminating the above mentioned drawbacks for inserts e.g. at too high a rotational speed will cause the inserts leave the tool holder disc.

Another object is to provide a device allowing safe and stable fixation of inserts even in very thin discs.

A further object is to provide a device where the dependency of remaining resiliency characteristics on the the material is to the largest possible extent eliminated and where the locking of the inserts is based on relations between configurations.

Still another object is to make it possible to use a per se known insert in slot milling tools.

SUMMARY OF THE INVENTION

This invention uses inserts of the kind having a shaft with one or more abutment faces being inclined to resist the possible pull out or loosening of the inserts from the device. The inserts being arranged to engage an opposite abutment of the device and besides that to arrange a manually settable abutment in such a way that, independently of the condition of the material, the intended clamping is ensured.

The device according to this invention is characterized by a number of peripherally discrete recesses in a disc shaped insert holder. The recesses have a shape adapted to receive the inserts wherein one side of each such recess includes an essentially V-shaped slot or ridge whereas an opposite side shows a protruding end portion arranged to, in the mounted position of the insert, engage an abutment surface of the insert being inclined from the direction of insertion beyond the top point of the inclined surface. The end portion is a part of a projection separated from the rest of the insert holder body by cuts in three directions to define a tongue like extension which against the inherent resistance of the material is bendable or displaceable relatively to the remainder of the body. In the insert holder body between the side of the tongue like extension facing away from the engagement end portion and an opposite portion of the insert holder body, a settable clamping device is arranged to, in a controllable way, press the tongue like extension towards the insert thereby creating a positive clamping of an insert arranged between the same and an opposite portion of the disc shaped body.

In the preferred embodiment, the settable clamping device is an eccentric or cam device mounted in an opening at the disc shaped insert body holder adjacent the one cut of the tongue like extension so that the eccentric or cam device, on turning thereof, engages the extension and displaces it towards the insert.

BRIEF DESCRIPTION OF THE DRAWING

A preferred embodiment of this invention will be described in the following with references to the accompanying drawing, in which.

DETAILED DESCRIPTION OF THE INVENTION

Figure 1:
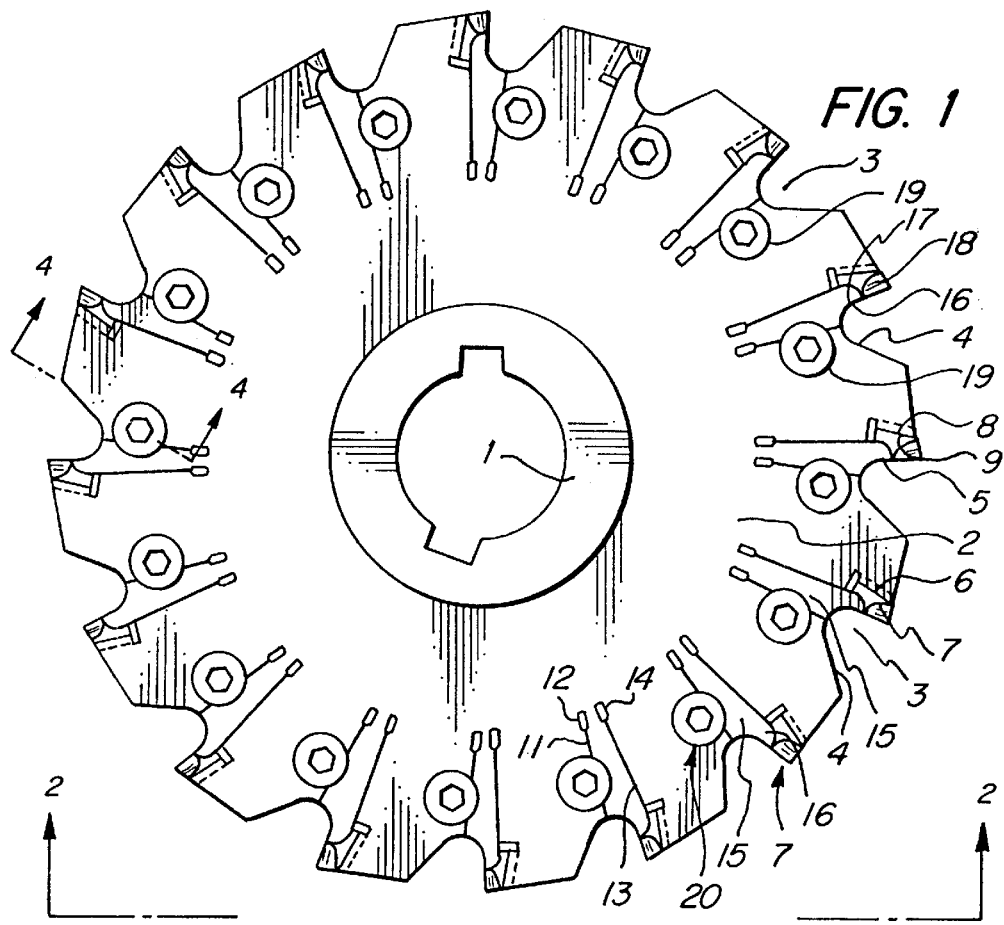
FIG. 1 is a side elevational view of a slot milling tool according to the invention so seen in axial direction.
Figure 2:
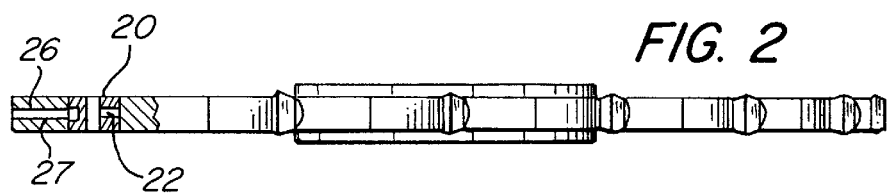
FIG. 2 is an elevational view taken along the 2—2 line of FIG. 1 with a portion broken away to reveal internal structure.
Figure 3:
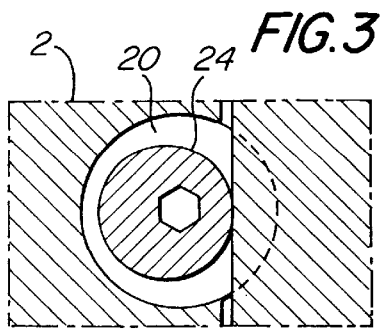
FIG. 3 is a sectional view illustrating, in axial direction, the eccentric or cam device and adjoining portions.
Figure 4:
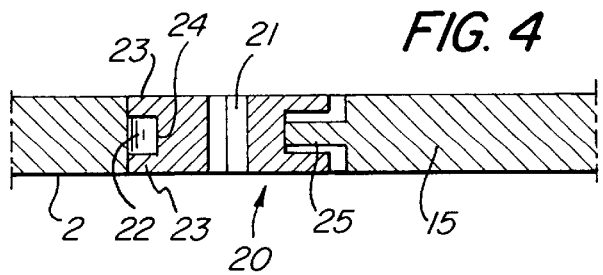
FIG. 4 shows the same as FIG. 3 in a radial sectional view along the line 4—4 in FIG. 1.

The embodiment shown in the drawing includes a hub portion 1 adapted for the milling machines to be used which hub portion is surrounded by a disc shaped milling body 2. At the periphery of the milling body disc 2, there are a number of recesses 3 having an oblique edge 4 and an essentially radially oriented edge 5. At the latter edge, there is a seat 6 for an insert 7 of a known type. The seat 6, has a V-shaped notch 8 intended to cooperate with the V-shaped lower or engagement side 9 of the insert 7. The radial extension of the notch 8 normally is larger than the length of the facing portion of the insert 7.

From the lowermost portion of each of the recesses 3, a slot like through cut 11 emerges ending in fracture preventing bore 12 and, from the area adjacent the insert seat 6, another such cut 13 having a corresponding bore 14. The two cuts 11,13 define a tongue like extension 15, projecting outwardly towards the bottom portion of each recess 3. As the tongue like extension 15 is connected in a cantilevered manner to the rest of the disc 2, it is obvious that it, against the inherent resistance action of the material, is movable or swingable around the material portion between the two bores 12 and 14. The end portion projecting towards the extension 15 has an abutment nose 16 arranged to engage primarily an engagement face 17 of the insert 7. The nose 16 is inclined against the direction of the insertion of the insert 7 and besides that forms an end stop for the insert by forming an abutment for the cutting head 18.

In openings 19 located so that the main part thereof is within the main part of the disc shaped body 2, clamping devices are arranged. These clamping devices each include a circular plate 20 having a centrally arranged hexagonal hole 21 and a peripherally arranged slot 22 on each side thereof leaving circumferential guiding edges 23. The bottom 24 of the slot 22 forms a cam or eccentric surface intended to engage a projection 25 arranged between the guiding edges 23. The projection 25 is a portion of the tongue shaped extension 15 having a reduced thickness and extends into part of the opening 19. On turning the plate 20 by means of an appropriate hexagonal key, the peripheries of the guiding edges 23 of the plate 20 will slide against the edge of the opening 19 while the projection 25 by influence of the slot bottom 24 acting as a cam surface will be displaced away from or allowed to approach the portion of the tool holder disc 2 where the plate 20 is rotatably arranged.

In order to ensure that each of the circular plates 20 remain in its respective opening 19, there are guiding pins 26 inserted through narrow bores 27 running from the periphery of the body 2 essentially radially into each opening or hole 19 in order to project into the slot 22 as a retaining abutment.

The rise of the slot bottom 24 forming a cam or eccentric surface is arranged in such a per se known way that a self locking effect is achieved. No further locking devices are necessary and the circular plate 20 will remain in each set position.

On mounting of inserts 7 in the circular tool holder disc 1,2, the inserts 7 are pushed, one into each seat, so that the V-shaped lower portion 9 of the insert 7 runs along the V-shaped abutment notch 8 whereupon the insert 7 will be pushed inwardly until the nose 16 of the tongue 15 has ascended the shaft portion of the insert, reached and passed the highest point thereof and thereupon followed the surface oppositely obliquely arranged until the rear portion of the cutting head 18 abuts against the tongue 15. In such a position, the tongue 15 has essentially returned to its neutral or uninfluenced position after having been forced outwardly by the protruding ridge of the insert shaft and allowed to descend the adjoining oblique face.

On turning the clamping device, i.e. Turning the circular plate 20 by means of a key inserted in its hole 21, in the clamping direction, the tongue shaped extension 15, because of the camming or eccentric action caused by the bottom 24 of a slot against the projection 25, will be pressed away forcefully which results in a heavy pressure being exerted by the end of the extension 15 towards the insert 7 and— because of the position of the mutual point of engagement— securing the same by means of a locking due to the relative shapes.

On replacing an insert 7 the circular plate 20 will be turned in the opposite direction resulting in a decrease of the pressure of the cam or eccentric surface against the projection 25 and loosening of the tongue shaped extension 15. On removing the insert 7 the extension 15 will, to start with, be lifted a little and then allowed to return to its neutral position.

By the device according to this invention, the simplest possible mounting and dismounting of inserts is achieved.

Furthermore, the invention achieves a stable clamping force an the inserts during work operations practically independent of the rotational speed of the milling tool.

The invention is not limited to the embodiment described above but can be varied within the framework of the following patent claims.

I claim:

1. Rotating milling tool device for use in slot or track milling, comprising:
    (a) an essentially disc shaped tool holder body defining a plurality of seats along a peripheral portion of said disc shaped tool holding body, each said seat to receive and position an insert, said tool holder body having a plurality of tongue shaped portions integral therewith, one of said tongue shaped portions adjacent each of said seats, each said tongue shaped portion having a cantilevered connection for permitting predetermined resilient deflection of said tongue shaped portion relative to said tool holder body, each said tongue shaped portion having an abutment portion at its free end adjacent its respective seat for engaging an abutment face of its respective insert, said abutment portion providing a tapered nose surface for engaging its respective insert, said tool holder body having an opening adjacent each said tongue shaped portion for receiving a clamping device;
    (b) an insert received in each seat of said tool holder body, each insert,having an abutment face obliquely arranged relative to its insertion direction and engaged by its respective abutment portion of its respective tongue shaped portion, each insert being dimensionally sized to engage its respective tapered nose surface on its respective abutment portion and resiliently deflect its tongue shaped portion about its cantilevered connection from a neutral, undeflected state upon insertion into its respective seat and, following insertion, being secured against removal in its respective seat by mutual cooperation of configurations of its respective tongue shaped portion and the tool holder body; and
    (c) a clamping device arranged in each said openings of said tool holder body, each clamping device including a rotatably arranged piece having a thickness essentially corresponding to that of the tool holder body, each clamping device further includes at least one surface to function as a cam, which cam surface upon rotation of said clamping device, is arranged to engage its respective tongue shaped portion on a side of its respective tongue shaped portion opposite from its respective abutment portion and displace its respective tongue shaped portion so that the abutment portion thereof engages the obliquely arranged face of the insert with an increasing force thereby securing its respective insert due to mutual cooperation of configurations of the insert and the tool holder body, the engagement of said cam surface with its respective tongue shaped portion being closer to said cantilevered connection than its respective abutment portion is to said cantilevered connection.

2. Device according to claim 1, wherein each cam surface of the clamping devices has such a rise that produces a self locking effect.

3. Device according to claim 1, wherein each rotatably arranged clamping device includes a circular plate having a centrally arranged tool engaging hole and two tool holder body opening engaging edges defining a peripherally arranged slot, a bottom of said slot forms said cam surface, each said opening in said tool holder body bridging a cut defining its respective tongue shaped portion in said tool holder body, each said tongue shaped portion has a projection straddled by the engaging edges of its respective circular plate and engaged with the slot bottom thereof for acting as an eccentric means for biassing the tongue shaped portion which in turn engages its respective insert.

* * * * *

UNITED STATES PATENT AND TRADEMARK OFFICE
CERTIFICATE OF CORRECTION

PATENT NO. : 5,820,309
DATED : October 13, 1998
INVENTOR(S) : Wlajko Mihic

It is certified that error appears in the above-identified patent and that said Letters Patent is hereby corrected as shown below:

In column 1, line 53, "on the" should be --of--.

In column 2, line 35, "so" should be --as--.

In column 2, line 53, "," after "6" should be deleted.

In column 3, line 49, "Turning" should be --turning--.

In column 3, line 59, --,-- should be inserted after "7".

In column 3, line 63, --,-- should be inserted after "7".

In column 4, line 2, "an" should be --on--.

In column 4, line 28, after "insert", "," should be deleted.

UNITED STATES PATENT AND TRADEMARK OFFICE
CERTIFICATE OF CORRECTION

PATENT NO : 5,820,309
DATED : October 13, 1998
INVENTOR(S) : Wlajko Mihic

It is certified that error appears in the above-identified patent and that said Letters Patent are hereby corrected as shown below:

Cover sheet of patent under References Cited, "1/1923 Proctor" should be --5/1923 Proctor--.

In column 1, line 12, after "pieces", --,-- should be inserted.

In column 1, line 36, after "ability", --to retain-- should be inserted.

In column 1, line 37, after "is", --allowed to-- should be inserted.

In column 1, line 37, "mater" should be changed to --material of the--.

Signed and Sealed this

Thirteenth Day of April, 1999

Q. TODD DICKINSON

Attest:

Attesting Officer

Acting Commissioner of Patents and Trademarks